United States Patent
Mattsson et al.

(10) Patent No.: US 7,418,098 B1
(45) Date of Patent: Aug. 26, 2008

(54) DATA TYPE PRESERVING ENCRYPTION

(75) Inventors: Ulf Mattsson, Stamford, CT (US); Kenneth Blomkvist, Skelleftea (SE)

(73) Assignee: Protegrity Corporation, Stamford, CT (US)

( * ) Notice: Subject to any disclaimer, the term of this patent is extended or adjusted under 35 U.S.C. 154(b) by 659 days.

(21) Appl. No.: 09/721,942

(22) Filed: Nov. 27, 2000

(51) Int. Cl.
*H04L 9/28* (2006.01)

(52) U.S. Cl. .............. 380/28; 380/29; 380/37; 380/42; 713/193

(58) Field of Classification Search ........... 713/167, 713/193; 380/267; 707/101, 103 R, 104.1
See application file for complete search history.

(56) References Cited

U.S. PATENT DOCUMENTS

| | | | | |
|---|---|---|---|---|
| 4,866,707 | A * | 9/1989 | Marshall et al. | 714/749 |
| 5,333,197 | A * | 7/1994 | Febvre | 380/267 |
| 6,327,595 | B1 * | 12/2001 | Lyson et al. | 707/201 |
| 6,389,414 | B1 * | 5/2002 | Delo et al. | 707/4 |
| 6,678,822 | B1 * | 1/2004 | Morar et al. | 713/182 |
| 6,950,518 | B2 * | 9/2005 | Henson et al. | 380/44 |
| 7,111,005 | B1 * | 9/2006 | Wessman | 707/9 |

FOREIGN PATENT DOCUMENTS

| | | |
|---|---|---|
| WO | WO 9749211 | 12/1997 |

OTHER PUBLICATIONS

Schneier, B., Applied Cryptography, 1996, John Wiley & Sons, 2nd Edition, pp. 15-17, 193-197, 208-210, 270-278.*
"Database Security in Oracle8i", Oracle Technical White Paper, Nov. 1999, Retrieved from the Internet on Mar. 7, 2005: <URL: http://www.oracle.com/technology//deploy/security/pdf/oow99/dbswp86.pdf>.*
Date, An Introduction to Database Systems, Aug. 1999, Addison-Wesley, Seventh Edition, pp. 43-47, 69-78, 249-253; 520-524.*
Oracle8i Supplied PL/SQL Packages Reference Release 2 (8.1.6)—DBMS_OBFUSCATION_TOOLKIT, Oracle, 1999, Retrieved from the Internet on Nov. 20, 2006: <URL: http://down-load-east.oracle.com/docs/cd/A81042_01/DOC/server.816/a76936/dbms_obf.htm>.*

* cited by examiner

*Primary Examiner*—Gilberto Barron, Jr.
*Assistant Examiner*—Minh Dinh
(74) *Attorney, Agent, or Firm*—Edwards Angell Palmer & Dodge LLP; George W. Neuner; William J. Daley, Jr.

(57) ABSTRACT

A method and a system for encryption of a data element in a relational database, wherein each data element includes a string of at least one character. The method includes the steps of: reading the type of a data element which is to be encrypted; interpreting the data type to form a restricting character set for each character of the data element; and encrypting each character of the data element into an encrypted character selected from the restricting character set.

9 Claims, 2 Drawing Sheets

DATA TYPE PRESERVING ENCRYPTION

FIELD OF INVENTION

The present invention generally relates to the field of data encryption and specifically to a method and a system for data type preserving encryption of a data element in a relational database.

BACKGROUND OF THE INVENTION

It is common to use client-server solutions for commercial applications. Hereby a separation of applications and data storage is provided. Development of applications and products for data storage and retrieval can be and is generally therefore also separated. One way of storing data is using a database as a structured and unified way of storage and retrieval. A standardized communication interface, such as SQL, is then usually used for data retrieval and storage in the databases in order to let application developers develop applications independently of the database software. In the software market of today, the development of database and application software is generally performed by different vendors.

The database vendors provides a framework and tools for storing and retrieving data, but it is up to the application developer to define the logical structure and design of the database. This is done through said communication interface. Design comprise issues like implementing the data model in tables in the database. The tables utilizes rows for representing data records and columns for different properties of a data record. Thus, a data element represent a property of a specific data record, i.e. a combination of a row and a column of a table. The restrictions and constraints of a data element in a database is defined by its type. The data type could for instance restrict which characters, the length of the data element, etc that can be stored in the database. The restrictions defined by the data type vary among the databases provided by different vendors.

In order to provide protection for data in databases, it is preferred to use a so-called granular security solution for the encryption of databases, instead of building walls around servers or hard drives. In such a solution, which is described in the document WO 97/49211 by the same applicant, a protective layer of encryption is provided around specific sensitive data-items or objects. This prevents outside attacks as well as infiltration from within the server itself. This also allows the administrator of the security solution to define which data stored in databases are sensitive and thereby focusing the protection only on the sensitive data, which in turn minimizes the delays or burdens on the system that may occur from other bulk encryption methods. Most preferably the encryption is made on such a basic level as in the data element level of the databases. Such security solutions are often provided between the database and the application intercepting the interface in between. Thus, they are transparent to the application.

However, when implementing security solutions for protecting individual data elements, such as the above described, the database design has to be adapted in order to accommodate the particular needs of a security solution. Any manipulation of the database design and structure will result in a cumbersome installation process and also increased maintenance costs. For example, if the structure of a database table has to be changed in order to accommodate an encrypted data element, this would require a costly conversion of the database table, especially if the table is populated with data. Such a change could be to introduce a new or change the properties of an existing column. Then, the interface between the application and the database has to be adapted in order to have the changed table to appear in its original form to the application in order to not violate any rules set up by the application. Then, on the other hand if the application requires a certain structure of the database and utilizes the restrictions implemented in the data type of the data element, problems are also likely to occur since for instance integrity checks will not be performed as expected by the application. Then, such checks will have to be implemented in the security solution. If then the database vendor changes their specifications of the data types or introduce new, which are also adapted by the application vendor, the security solution will also have to be amended.

OBJECT OF THE INVENTION

It is therefore an object of the present invention to provide an improved method and system for encryption of data elements in a relational database reducing the need for changes of the database design overcoming above mentioned problems.

The object is achieved by a method and a system according to the appended claims.

SUMMARY OF THE INVENTION

According to the invention a method for data type preserving encryption of a data element in a relational database, wherein said database comprises a plurality of data elements of at least one type, and each data element comprises a string of at least one character, comprises the steps of: reading the type of a data element which is to be encrypted; interpreting said data type in order to form a restricting character set for each character of said data element; encrypting each character of said data element into an encrypted character using said restricted character set to control the encryption process to only create encrypted characters included said restricted character set.

Hereby, a method is provided which reduces the need for changes to the database design by preserving the data type in the encrypted data element. The preservation means that the ciphertext is as valid as the plaintext it replaces. Then using this method for encryption of individual data elements will not require a change of the data type of the data element which is to be encrypted. Since the data could be stored in the same column, the storage requirements does not increase when the security solution is implemented. Then, since the original column could be used, no changes to the database design has to be performed. Also, the risk for violating vendors maintenance agreements is reduced.

Thus, a security solution is provided which is both application transparent and database table transparent. This results in easier installation of the security solution and simplified maintenance of both the security solution and the database.

The advantages above are accomplished by taking the restrictions as defined by the data types, which data types are defined in the database and set up by either the database vendor or the application vendor or both, and use them in the encryption process. Preferably, the encryption means then interprets these data types and use them to control the encryption process. The interpretation process could for example comprise activities like analyzing the definitions of data types and which components they are constructed of. Then this analysis could be stored and retrieved when the interpretation process is invoked. In one embodiment this is done in advance for each data type and in another embodiment this is done when the actual encryption is to take place. Then the encryption is performed to provide a ciphertext field which follow the restrictions and constraints of the data type. Preferably, the is controlled to provide encryption that results in a data element having the same number of characters as the unencrypted data element.

In a embodiment the method comprises the further step of arranging one or more character sets in a pattern for a data type. Hereby, the work needed for interpreting a data type and form restricting character sets is reduced to reading a pattern corresponding to the data type. For example, a data type restricting the data of the data element to integers would result in a pattern of consecutive character sets containing the numerals 0-9. Thus, such a pattern would facilitate the interpreting process in the previously mentioned step.

In a preferred embodiment of the present invention, the method comprises the further steps of converting each character to an index value and adding a varying value to each index value before encryption. Hereby, a method is provided which reduces the risk for encrypting adjacent characters the same way when similar characters occur in sequence. Preferably, the varying integer value is obtained by the steps of: creating an initial value by hashing the encryption key; adding adjacent index values pairwise from the left to the right using said initial value when adding the leftmost character.

Also according to the invention a system for data type preserving encryption of a data element in a relational database, comprising: a database, wherein said database comprises a plurality of data elements of at least one type, and each data element comprises a string of at least one character, comprising the steps of: reading means for reading the type of a data element which is to be encrypted; interpretation means for interpreting said data type in order to form a restricting character set for each character of said data element; and encryption means for encrypting each character of said data element into an encrypted character using said restricted character set to control said encryption means to only create encrypted characters included said restricting character set.

The advantages of the system according to the invention corresponds to those of the inventive method.

BRIEF DESCRIPTION OF THE DRAWINGS

For exemplifying purposes, the invention will be described to embodiments thereof illustrated in the attached drawings, wherein.

DESCRIPTION OF PREFERRED EMBODIMENTS

Figure 1:
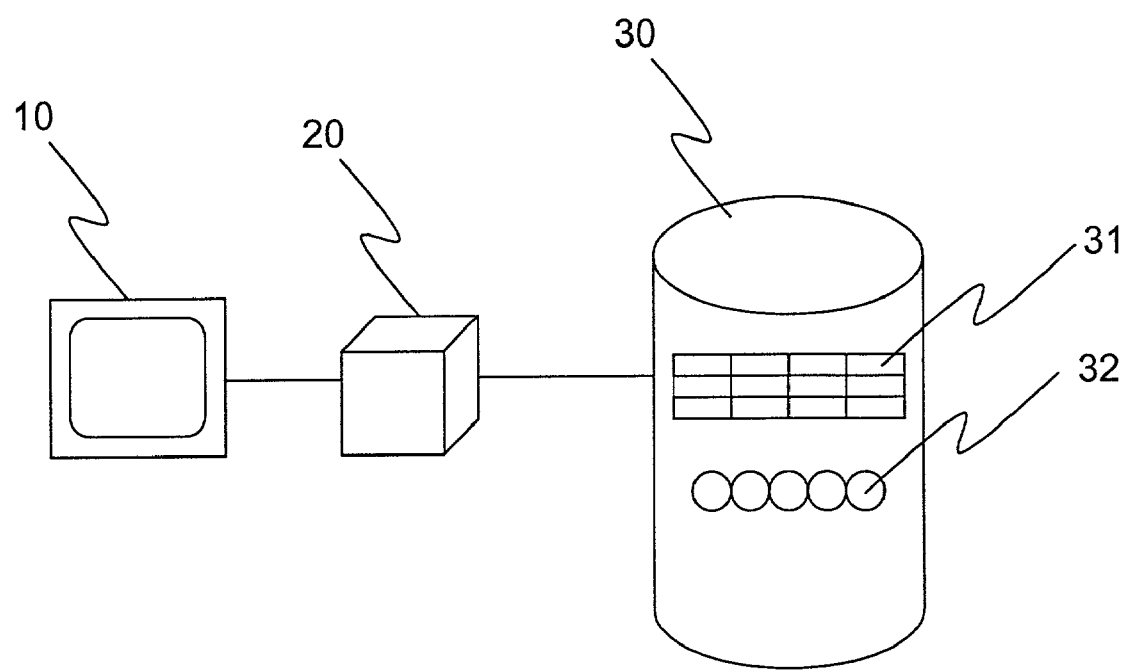
FIG. 1 is a schematic view of an applicable environment for the method according to the invention.

The inventive method is a method for data type preserving encryption of a data element in a relational database. The method provides a new way of using security solutions on databases, since the need for redesigning the database is significantly reduced. The method will now be described in an example of an applicable environment illustrated in FIG. 1. The environment comprises an application 10, encryption means 20 and a database 30. The database comprises a plurality of data elements 31, each associated with a data type 32. The data type defines at least the valid characters of the data element. Common data types used in commercial databases are for instance INTEGER, FLOAT, CHAR, BOOLEAN, and DATE. These correspond to integers, floating numbers, all alphanumerical characters including non-alphabetical letters, a true or false value, and date, respectively. In most cases these are specified with an appropriate length for each data element. In some instances the length is naturally defined by the data type, such as for the DATE format.

The application 10 is connected to the database 30 in order to store at least some of its data, for example personnel records. The data element which is subject for encryption is then encrypted in the encryption means 20. Utilizing encryption means below the application makes the encryption application transparent. Thus, the encryption means is provided for intercepting data storage and retrieval requests from the application. Preferably, the rules defining which data elements that are to be encrypted is set up in the encryption means leaving the database and the application unaffected. With the inventive method the security solution will also be database table transparent since the database design will be unaffected when introducing encryption for a data element.

Figure 2:
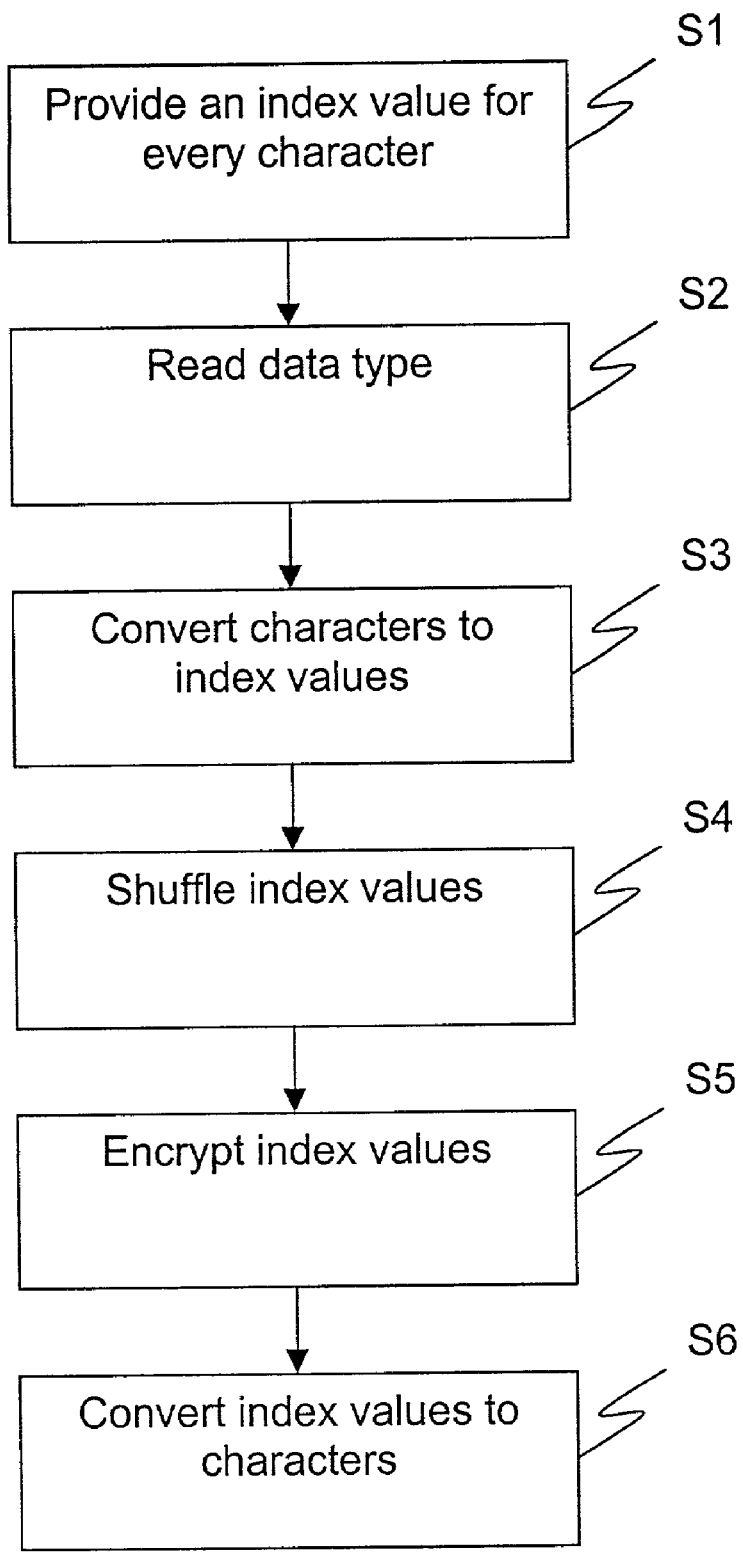
FIG. 2 is a flow-chart illustrating a method according to an embodiment of the invention.

The invention will now be illustrated by how a data element is encrypted with the inventive method. Referring to FIG. 2, a method for data type preserving encryption of a data element in a relational database according to a preferred embodiment of the invention is now to be described.

The method comprises a first step S1, wherein an index value is provided for each character. This could preferably done in advance for all available characters, i.e. all letters, numbers, special characters, control characters, etc, that are used in the database. Preferably this is done by taking the ASCII value of each character. However, this could also be done at the time for encryption of each character of the data element which is to be encrypted in the encryption means. For instance "A" could be represented by "1", "B" by "2", etc.

Then, when a data element is to be written to the database by the application 10, the encryption means have to know the data type of the data element where the data is to be stored. The data type is read in the step S2.

In order to use encryption algorithms like DES (Data Encryption Standard), the characters have to be converted to numerals. In a step S3, the characters are converted to corresponding index values as defined in the step S1.

In order to ensure that the encrypted values of two single character strings with adjacent characters will not be sequential, the index values could preferably themselves be shuffled based on a portion of the encryption key. For instance, it is not desired to let "b" be encrypted as "y" whenever "a" is encrypted as "x". Then in a step S4, the data is "rippled" from the left to the right and preferably again from the right to the left. This could be done by hashing the encryption key into an initial value and add adjacent values pairwise. Then, as preferred, the same procedure is applied to the permutation of the individual characters. Now the fact that two strings that contain the same characters is disguised.

Then, in a step S5 the index values, and preferably the shuffled index values, are encrypted by the encryption means. Preferably the DES algorithm is used to protect sensitive data to produce the encrypted index values. In this embodiment this is performed in the following steps:

1. The DES algorithm takes as input a 64-bit input block and a 64-bit key (56 key bits and 8 parity bits) and uses these two values to produce a 64-bit output. The ciphertext output can be decrypted using the same key.

2. DES can be operated as a stream cipher in "cipher-feedback" mode. This mode is used to encrypt one index value at a time.

3. At the end of each encryption pass, the plaintext data is also shifted into the DES input register by the steps of:

a. representing the alphabet index values of the n-character, plaintext input string with:

$i1\ i2\ i3\ i4\ldots i8$ b. constructing the 64-bit DES initial value required by cipher-feedback mode based on a portion of the encryption key:

$a1\ a2\ a3\ a4\ldots a8$ wherein each value represents an 8-bit number (0-255).
c. letting the output of the DES algorithm be:

$b1\ b2\ b3\ b4\ldots b8$ d. The first transformed index value is the modular sum:

$z1=b8+i1 \pmod{I}$ where I is the size of the restricting character set
e. constructing a new DES input value as:

$b2\ b3\ b4\ldots b8\ i1$ f. obtaining a new DES output:

$c1\ c2\ c3\ c4\ldots c8$ g. producing the second transformed index value with the modular sum:

$z2=c8+i2 \pmod{I}$.

After n such steps, during each of which a single input index value is transformed, we have an encrypted index-value string:

$z1\ z2\ z3\ldots zN$

In cipher-feedback mode, DES decryption is never invoked. Reversing the transformation is done by subtracting the low order DES output from the transformed index value.

Here every character in the restricting character set is given an sequential ordinal, and the highest number represent the size, I, of the restricting character set. In this embodiment each individual character of the data element is assigned a specific character set. This could be useful for data types which are composites of letters and numerals organized with for example a some letters followed by some numerals. It could also be used for databases which use some semantic restrictions, on for example the date format. Here the character set could be a subset of the numerals 0-9. However, it should also be possible to use the same character set for all characters of a data element, for example with data elements where all characters have the same restrictions, such as all alphanumerical.

The interpretation of the data type in order to create restricting character sets could be done in advance for all current data types of the database. This will result in increased performance. These could then be organized in patterns for each data type. For example, the data type INTEGER with the length of 8 bytes, a pattern of character set could be eight consecutive character sets containing the numerals 0-9.

Then, in a step S6, the encrypted index values are converted back to characters.

We now have an encrypted data element which fulfills all the requirements according the type of the data element where it is to be stored.

The invention has been described above in terms of a preferred embodiment. However, the scope of this invention should not be limited by this embodiment, and alternative embodiments of the invention are feasible, as should be appreciated by a person skilled in the art. For example, the application, the encryption means and the database have herein been described as separate units. It is apparent to a person skilled in the art that these units could be comprises within one or a combination of units. Also, in another embodiment, instead of the restricting character set used for controlling the encryption means, a set of corresponding index values could be used.

Such embodiments should be considered to be within the scope of the invention, as it is defined by the appended claims.

The invention claimed is:

1. A method encrypting characters from a data element in a database, the method comprising:
   reading information identifying a data type associated with data in a particular column of the database from a location in the database, the location being outside the particular column;
   reading a data element from the particular column, the data element including a first character string;
   associating an index value with each character in the first character string;
   defining an initial value;
   creating a second character string formed by replacing each character in the first character string with the character's associated index value;
   replacing each index value in the second character string with a result obtained from adding adjacent index values pairwise from the left to the right using the initial value when adding the leftmost character;
   encrypting the second character string wherein each character in the encrypted second character string is a valid member of the identified data type associated with the data element, where said encrypting includes converting encrypted replaced index values to characters; and
   storing the encrypted second character string at the particular column of the first character string in the database.

2. A method according to claim 1, wherein the step of associating an index value further comprises:
   arranging one or more character sets in a pattern for a data type; and
   using the pattern to determine the association of index values with each character in the first character string.

3. A method according to claim 1, wherein the number of characters in the encrypted second character string is equal to the number of characters in the first character string.

4. A method according to claim 1, wherein the step of replacing each index value in the second character string further includes adding a varying value to each index value.

5. A method according to claim 1, wherein the encryption is performed using the DES algorithm in stream cipher mode.

6. The method of claim 1, wherein the initial value is defined by hashing an encryption key.

7. The method of claim 1, wherein the step of replacing further includes adding adjacent index values pairwise from the right to the left using the initial value when adding the leftmost character.

8. A method encrypting characters from a data element in a database, the method comprising:
   reading information identifying a data type associated with data in a particular column of the database from a location in the database, the location being outside the particular column;
   reading a data element from the particular column, the data element including a first character string;
   associating an index value with each character in the first character string;
   defining an initial value by hashing an encryption key;

creating a second character string formed by replacing each character in the first character string with the character's associated index value;
replacing each index value in the second character string with a result obtained from the steps of:
adding adjacent index values pairwise from the left to the right using the initial value when adding the leftmost character to obtain a first shift result;
adding to the first shift result adjacent index values pairwise from the right to the left using the initial value when adding the leftmost character to obtain a second shift result; and
adding to the second shift result a varying value;
encrypting the second character string wherein each character in the encrypted second character string is a valid member of the identified data type associated with the data element, where said encrypting includes converting encrypted replaced index values to characters; and
storing the encrypted second character string at the particular column of the first character string in the database.

9. A method according to claim 8, wherein the encryption is performed using the DES algorithm in stream cipher mode.

* * * * *